US006419891B1

(12) United States Patent
Kennedy et al.

(10) Patent No.: US 6,419,891 B1
(45) Date of Patent: *Jul. 16, 2002

(54) SYNTHETIC CRYSTALLINE MCM-69, ITS SYNTHESIS AND USE

(75) Inventors: Carrie L. Kennedy; Gordon J. Kennedy, both of Turnersville; Stephen L. Lawton, deceased, late of Pitman, by Barbara Lawton, legal representative; Louis D. Rollmann, Moorestown; John L. Schlenker, Thorofare, all of NJ (US)

(73) Assignee: ExxonMobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,269

(22) Filed: Oct. 18, 1999

(51) Int. Cl.[7] .................... C01B 33/12; C01B 33/38; C01B 37/02
(52) U.S. Cl. .............. 423/328.2; 423/329.1; 423/335; 423/339; 423/718; 208/118
(58) Field of Search .................. 423/328.2, 329.1, 423/335, 339, 118.1, 706, 708, 718; 208/118

(56) References Cited

U.S. PATENT DOCUMENTS

| | | | | |
|---|---|---|---|---|
| 4,287,166 A | | 9/1981 | Dwyer et al. ............ 423/705 |
| 4,578,259 A | * | 3/1986 | Morimoto et al. .......... 423/718 |
| 4,743,437 A | * | 5/1988 | Whittam | |
| 5,266,541 A | * | 11/1993 | Kresge et al. ............ 502/64 |
| 5,362,697 A | | 11/1994 | Fung et al. ............ 502/71 |

FOREIGN PATENT DOCUMENTS

WO 98/03453 1/1998

OTHER PUBLICATIONS

A. J. Blake, K.R. Franklin, and B.M. Lowe, J. Chem. Soc., Dalton Trans., 2513 (1988). (No Month).

S. J. Andrews, M.Z. Papiz, R. McMeeking, A. J. Blake, B.M. Lowe, K.R. Franklin, J.R. Helliwell, and M. M. Harding, Acta Cryst. B44, 73 (1988). (No Month).

Translated Abstract of Yu et al., "Preparation and Properties of Layered Silica and Layered Alumino–Silica Hydrate From Natural Apophyllite," vol. 106, No. 1230, *Journal of the Ceramic Society of Japan*, pp. 160–168 (Feb. 1998).

Franklin et al. "Crystallization of Silica Molecular Sieves from Piperazine–Quaternary Ammonium Bromide–Silica–Water Systems," *Zeolites*, vol. 8, pp. 501–507, (Nov. 1988).

* cited by examiner

*Primary Examiner*—David R Sample

(57) ABSTRACT

This invention relates to a new synthetic crystalline material comprising acidic surface silanol groups, designated MCM-69, a method for its preparation and use thereof in catalytic conversion of organic compounds.

16 Claims, 4 Drawing Sheets

DEGREES TWO-THETA

DEGREES TWO-THETA

SYNTHETIC CRYSTALLINE MCM-69, ITS SYNTHESIS AND USE

BACKGROUND OF THE INVENTION

1. Field of the Invention

This invention relates to a novel synthetic crystalline material MCM-69, comprising a dispersible silica hydrate having acidic surface silanol groups, to its exfoliated products, to a method for their preparation, and to their use in hydrophilic and hydrophobic aggregates and dispersions, such as coatings and catalysts.

2. Description of the Prior Art

In hydrothermal crystallization between about 100 and 180° C., piperazine is known to yield a number of siliceous structures, including clathrasils or clathrate group tectosilicates (clathrates), such as ZSM-39, disclosed in U.S. Pat. No. 4,287,166, molecular sieves (e.g., FER-type structures), and layer silicates (e.g., EU-19). Clathrates have been defined as a group of tectosilicates characterized by a structure analogous to gas hydrates (water-clathrates) wherein the oxygens linking non-oxygen framework atoms (T-atoms) in a tectosilicate framework structure are analogized to the hydrogen bonds linking oxygens in the gas hydrates. See, Hydrothermal Chemistry of Zeolites, R. M. Barrer, Academic Press, London (1982). Members of the clathrate group include the mineral melanophlogite as well as dodecasils such as ZSM-39 which typically consist of cages comprising pentagonal rings. Dodecasils, which have a dodecahedral host lattice, are further described in Angew, Chem. Int. Ed. Engl., 21 (1982) No. 3 at pp. 206–207. The clathrates exhibit very limited sorptive and exchange properties, probably owing to their being made up of rings having no more than 6 members. Thus, while certain species may contain relatively large hexakadecahedral or icosahedral cages, sorption of even small molecules is limited because entry into the interior large cages is restricted by the 5-and/or 6-membered rings which make up such cages. Furthermore, the clathrates are characterized by relatively low surface area.

EU-19 was originally synthesized by A. J. Blake, K. R. Franklin, and B. M. Lowe and published in J. Chem Soc., Dalton Trans., 2513 (1988). Designated a crystalline "piperazine silicate," its structure was determined to contain "silicate double layers separated by and hydrogen bonded to piperazinium ions" [S. J. Andrews, M. Z. Papiz, R. McMeeking, A. J. Blake, B. M. Lowe, K. R. Franklin, J. R. Helliwell, and M. M. Harding, Acta Cryst. B44, 73 (1988)]. Notably, "EU-19 does not contain any loosely bound or occluded water." Moreover, the structure of EU-19 was reported "to collapse to a product with a few broad peaks" in its x-ray diffraction (xrd) pattern when the piperazine (pipz) was removed. When heated in air above 300° C., EU-19 converted to "a new silica polymorph EU-20 . . . (which is characterized by) its high thermal stability and its complete lack of sorptive properties."

SUMMARY OF THE INVENTION

The present invention is directed to a novel crystalline material, named MCM-69, which in its as-synthesized form is characterized by an X-ray diffraction pattern including values substantially as set forth in Table I of the specification and which is believed to have a composition comprising the approximate molar formula: $H_2O.6SiO_2$. MCM-69 may also contain small amounts of aluminum, substituting for silicon atoms in the crystalline structure. In general, the atom ratio of Al:Si in MCM-69 will be less than about 0.01, providing an approximate molar formula: $H_2O.(SiO_2)_{(6-x)}(Al_2O_3)_x$ where x is less than about 0.01. The invention is also directed at the exfoliated products of MCM-69.

It has now been found that piperazine can be substantially removed from a material which appears to have the general topology of EU-19, to obtain a crystalline silica hydrate product, MCM-69, which has a distinctive xrd pattern, which does not convert to EU-20 on heating above 300° C., and which appears to be comprised of single, crystalline layers of silica having a high surface concentration of reactive silanols. Specifically, in the ideal MCM-69 structure, one out of every three Si atoms in MCM-69 appears to contain a silanol group. The silanols can be reacted with a variety of organic and inorganic chemicals to generate a substantial and diverse series of useful products.

The invention further resides in a method for the preparation of MCM-69, in the characteristic exfoliation of MCM-69, and in its use and that of its exfoliated products in the preparation of hydrophilic and hydrophobic aggregates and dispersions.

DESCRIPTION OF SPECIFIC EMBODIMENTS

Figure 1:
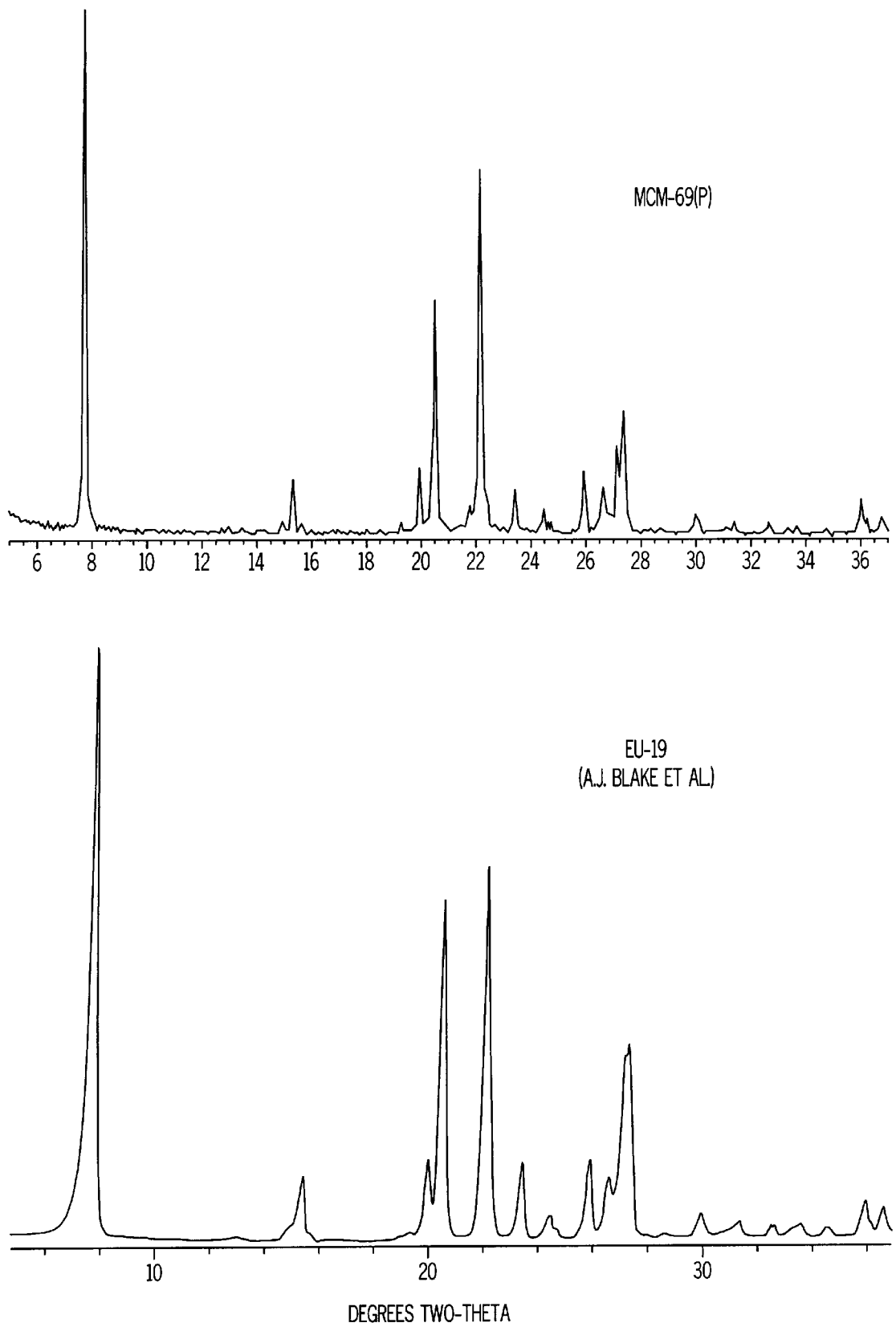
FIG. 1 compares the X-ray diffraction pattern of the precursor of MCM-69, designated herein as "MCM-69(P)", and EU-19.

The crystalline material of this invention, MCM-69, is a single crystalline phase which can be prepared in essentially pure form with little or no detectable impurity crystal phases and has an X-ray diffraction pattern which is characterized by the lines listed in Table 1 below:

TABLE 1

| 2 θ (°) | d (Å) | Relative Intensity |
|---|---|---|
| 9.3 | 9.54 | vs |
| 12.7 | 6.94 | vw |
| 16.6 | 5.34 | vw |
| 18.9 | 4.69 | vw |
| 19.4 | 4.57 | vw |
| 21.9 | 4.06 | m |
| 23.9 | 3.72 | w |
| 25.8 | 3.44 | vw |
| 26.8 | 3.33 | w |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines. The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes, particularly with a laminar material such as MCM-69, can include minor changes in unit cell parameters and/or a change in crystal symmetry, without a change in the structure. These minor effects, including changes in relative intensities and noticable shifts in individual d-spacings, can also occur, particularly with respect to the xrd reflection at lowest angle (2θ) or highest d-spacing in the present MCM-69, as a result of differences in thermal history, specifically in the degree of drying. Excessive drying will destroy MCM-69, likely by the crosslinking of its silica hydrate layers, with resultant loss of surface silanols, loss of dispersibility, and loss in intensity of the xrd reflection at highest d-spacing.

The crystalline material of this invention, MCM-69, has a composition described by the approximate molar formula: $H_2O.6\ SiO_2$. It also contains a significant quantity of occluded water. It is prepared by the careful removal of all or substantially all organic (pipz) from its crystalline precursor material, MCM-69(P).

The above crystalline MCM-69 material can be transformed or exfoliated by swelling with a variety of surface-bonding agents, e.g., amines. Its surface can be rendered hydrophobic by treatment with reagents such as hexamethyidisilazane. Its surface can be bonded to metal ions, e.g., tri- or other-valent Cr. It can be reacted with base, such as quaternary ammonium hydroxide. Swelled MCM-69 can be rendered porous by "pillaring" with inorganic reagents such as tetraethylorthosilicate, a hydrolyzable silicon compound. Moreover, in many of these forms, MCM-69 can be bound usefully in aggregation with more highly porous materials, e.g., zeolites, to improve the catalytic behavior of said material. When such exfoliation is accomplished, the product will be characterized by an xrd pattern in which the most intense reflection lies at a d-spacing of between 8.4 Å and 25 Å, corresponding to a 2θ angle of between about 10.5° and 3.5°, respectively, and preferably a d-spacing of between 10 Å and 20 Å, corresponding to a 2θ angle of between 8.8° and 4.4°, respectively. In general, such exfoliated materials have a strong xrd reflection below about 10.5°2θ.

The MCM-69(P) precursor to the present crystalline material can be prepared from a reaction mixture containing sources of alkali or alkaline earth metal (M), preferably sodium, cation, optionally an oxide of trivalent element X, e.g., aluminum and/or boron, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | >100 | >1000 |
| $H_2O/YO_2$ | 10–40 | 20–30 |
| $OH^-/YO_2$ | 0.01–0.3 | 0.05–0.2 |
| $M/YO_2$ | 0.01–0.3 | 0.05–0.2 |
| $R/YO_2$ | 0.5–3.0 | 1.5–2.5 |

The organic directing agent R used herein is piperazine.

Crystallization of MCM-69(P) can be carried out at either static or stirred conditions in a suitable reactor vessel, such as for example, polypropylene jars or Teflon™ lined or stainless steel autoclaves, at a temperature of 80° C. to about 250° C., preferably 100° C. to about 180° C. for a time sufficient for crystallization to occur at the temperature used, e.g., from about 12 hours to about 100 days, preferably 20 to 100 hours. Thereafter, the crystals are separated from the liquid and recovered. It is believed important that the as-crystallized, pipz-containing material not be washed or dried excessively. The presence of modestly excess pipz and/or water appears to help prevent inadvertent crosslinking of the silica hydrate sheets, which would render them difficult or impossible to swell and disperse, i.e., to exfoliate.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

The crystals prepared by the instant invention can be converted to MCM-69 by treatment with a variety of acids, either in aqueous or nonaqueous medium. One common and very useful acid is an aqueous solution of HCl, effective at concentrations ranging from 0.1 to 12M, preferably from 0.5M to 6M. Other acids are effective as well, and examples include $HNO_3$, $H_2SO_4$, $H_3PO_4$, trifluoromethanesulfonic acid (triflic acid), acetic acid, and numerous others.

The ease with which and degree to which pipz is removed from between the silica hydrate layers of the precursor, MCM-69(P), depends on acid concentration, treatment time and treatment technique, and on the success with which undesired crosslinking of the precursor layers has been avoided. With a satisfactory precursor, a minimum of 50%, preferably more than 80%, and most preferably more than 90% of the pipz will be removed by stirring the precursor with acid at room temperature for a period of from 1 to 100 hours or more and filtering. Even longer or shorter stirring times and elevated temperatures, although generally not more than 80° C., can be used as well.

It is essential that the MCM-69 material obtained after acid removal of the pipz not be dried, as drying leads to irreversible crosslinking of the silica hydrate layers, loss of x-ray crystallinity, most particularly as evidenced by a loss in intensity of the xrd reflection at between 9.3 and 9.6° 2θ, and loss of swellability and dispersibility. Thus, the MCM- 69 samples obtained under non-drying conditions after acid-wash and filtration will contain substantial amounts of excess water, generally more than 10% to 40% and perhaps as much as 80% by weight.

Swelling and dispersing of MCM-69, i.e., exfoliation, occurs readily on contact with amine, either neat or in solution, preferably primary amine, apparently by the formation of an H-bond between the amine and the surface. Effective amines generally include compounds such as cyclic and noncyclic, $C_2$–$C_{22}$ alkylamines, but any amine having a pKa above about 7 and preferably above about 10 can be considered. In general, the molar ratio of amine:$SiO_2$ in the contacting process will exceed 0.1, preferably 0.33, and more preferably 0.5. There is virtually no limit to the amount of excess amine which can be used, since the excess is removed on filtration. Thus, molar amine:$SiO_2$ ratios of 5, 10, or 20 can be easily anticipated. Since MCM-69, assynthesized from MCM-69(P), will normally contain residual acid, e.g., HCl, it will be common to contact the MCM-69 sample repeatedly with amine or amine solution. Repeated contact with fresh amine or amine solution removes the extraneous residue of that acid.

Similarly, to render the material hydrophobic, it will be common to contact MCM-69 or its amine adducts with a reagent which bonds covalently to surface silanols, e.g., hexamethyldisilazane. Again, the molar ratio of reagent:$SiO_2$ will normally exceed 0.1, preferably 0.33, and more preferably 0.5. Again, there is virtually no limit to the amount of excess reagent which can be used. Depending on the chemical form of the MCM-69 sample (hydrate or amine) and the reactivity of the surface-bonding reagent, reaction conditions for the surface-bonding process will vary. In some cases, MCM-69 and reagent will react satisfactorily by simply stirring the two together at room temperature for a period of from 1 to 100 hours and filtering. Even longer or shorter stirring times and higher temperatures, generally not more than 120° C., can be used as well.

The surface silanols of MCM-69 can also be reacted with conventional base, e.g., with hydroxide ion. Such ion can be supplied in combination with a variety of cations, to include quaternary ammonium ion or alkali or alkaline earth ion. In contrast to amine and the covalently bonding reagents cited above, a substantial excess of hydroxide over that required by the surface silanols (and any acid residue from the pipz removal process) is to be avoided. Thus, ignoring any acid residue, the hydroxide:$SiO_2$ ratio will normally be between 0.1 and 0.6, preferably about 0.33. Reaction conditions will be similar to those used with amines and covalently bonded reagents.

The crystalline material of this invention can be used to catalyze a variety of chemical conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. Specific examples particularly include hydrocarbon conversion reactions such as catalytic cracking and catalytic dewaxing.

As in the case of many catalysts, it may be desired to incorporate MCM-69 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction MCM-69, i.e., combined therewith or present during synthesis, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcining.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

This Example describes a synthesis of MCM-69(P), i.e., MCM-69 Precursor, a material whose xrd pattern strongly resembles that of EU-19. To a stirred solution of 3.6 g of 50% (wt.) NaOH in 240 ml distilled water are added 30 g of precipitated silica (Ultrasil VN3, 92.4% $SiO_2$, 0.1% $Al_2O_3$, 0.4% $Na_2O$, 6.7% $H_2O$, available from United Silica, Industrial, Ltd., Taiwan or Degussa), followed by 78 g of piperazine (pipz). The slurry has a pH of about 13.2 and a molar composition:

| | |
|---|---|
| $SiO_2/Al_2O_3$ = 1000 | Na/$SiO_2$ = 0.1 |
| Pipz/$SiO_2$ = 2.0 | OH/$SiO_2$ = 0.1 |
| $H_2O$/$SiO_2$ = 30 | |

After crystallization in a stirred autoclave at 160° C. for 65 hours, the slurry has a pH of 13.2. The solid is filtered, washed with water, dried briefly at 120° C., and weighed (about 25 g). Except for the presence of a small amount of aluminum and sodium ($SiO_2/Al_2O_3$ ratio ca. 900, 0.2% Na), its xrd pattern and its elemental analysis (5.9% N, 10.2% C, 73.9% $SiO_2$ and 74.4% ash) are very similar to those published for EU-19 (see A. J. Blake et al. and S. J. Andrews et al., respectively, loc. cit.). Its ash analysis indicates 3–4% excess water. $^{13}C$ NMR shows the pipz molecules to be intact and protonated. Scanning electron micrographs (SEM's) show the material to be relatively uniform, lathe-like platelets, generally less than 5 $\mu$ in length. Its xrd pattern is compared with a published pattern for EU-19 in FIG. 1. Note the sharp strong reflection at about 7.7° 2θ.

EXAMPLE 2

This Example describes a preparation of MCM-69 from MCM-69(P). A 5 g sample of MCM-69(P) is stirred with 20 ml 6N HCl for 6 hrs at room temperature, then filtered, and washed with water. The HCl treatment is repeated overnight, and the washed product is submitted for xrd and elemental analysis. It analyzes 72.2% ash and 0.1 % nitrogen. Over 95% of the N (pipz) is removed, and the sample contains approximately 28% water and residual HCl. The xrd pattern of this sample of MCM-69 contains a sharp strong reflection at 9.6° 2θ. When an alternative acid is used similarly, e.g., $HNO_3$, the resultant MCM-69 shows a sharp strong xrd reflection at 9.5° 2θ and none at 7.7° 2θ. The 9.5° 2θ peak disappeared upon simple drying of the MCM-69 sample at 120° C. and did not reappear on treatment of the dried sample with 6MHCl.

EXAMPLE 3

Figure 2:
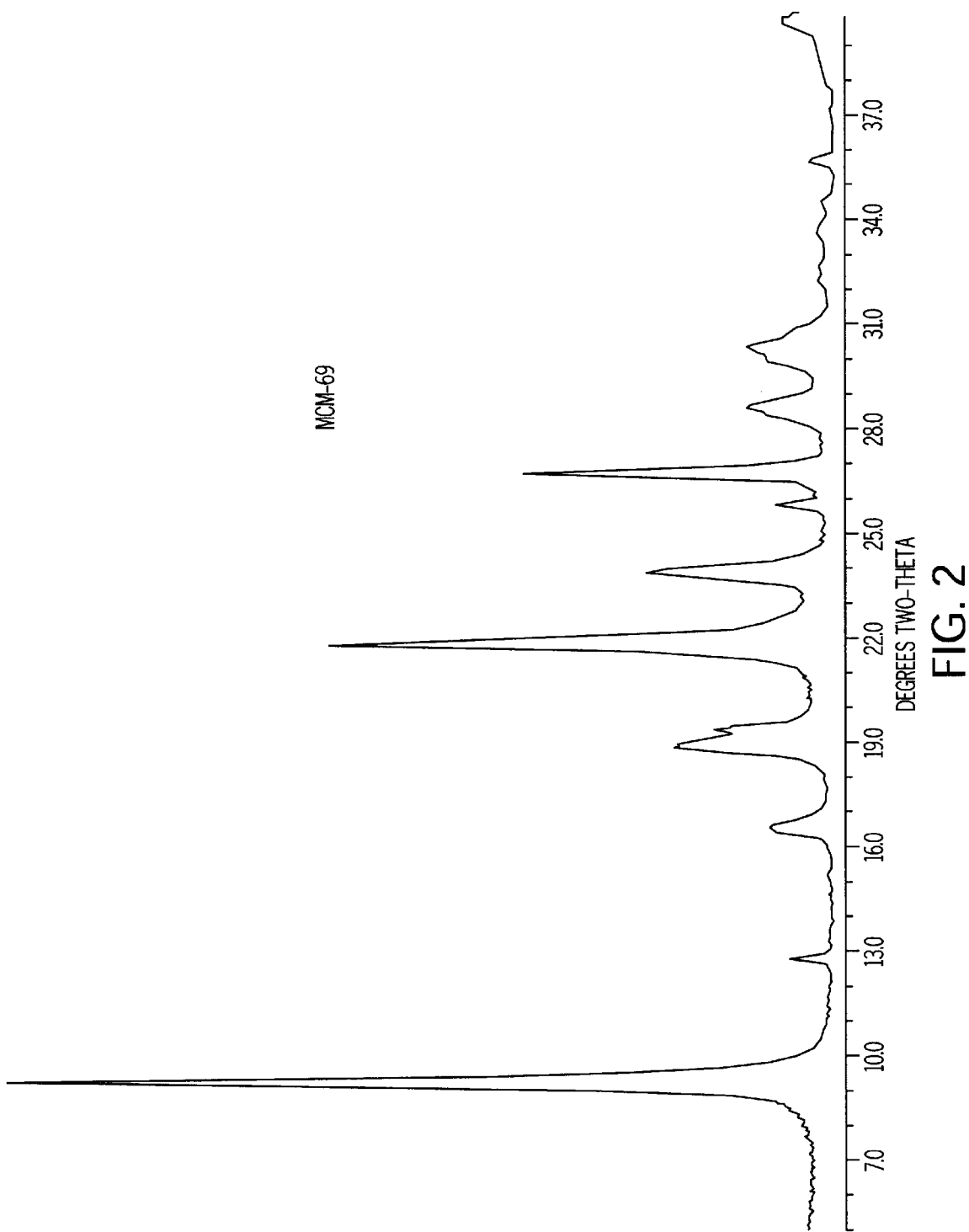
FIG. 2 shows the X-ray diffraction pattern of the as-synthesized product of MCM-69 prepared by acid treatment of MCM-69(P).

This Example describes the preparation of MCM-69 from MCM-69(P) using more dilute acid. A 50 g sample of MCM-69(P) is stirred with 200 ml 0.5N HCl for 1–2 hrs at room temperature and filtered. The procedure is repeated, and the resulting filtered product is washed with 1 liter of 0.5N HCl. This sample exhibits the xrd pattern shown in FIG. 2, which contains a sharp strong reflection at 9.3° 2θ and which is easily distinguishable from those shown in FIG. 1. $^{29}Si$ NMR shows that approximately one third of the silicon atoms contain pendant silanol groups, while two thirds are bonded through oxygen to four neighboring Si's. $^{13}C$ NMR shows that the piperazine is very effectively removed; elemental analysis shows that about 89% of the N is removed.

EXAMPLE 4

This example describes the reversible addition of an amine to MCM-69, namely, n-propylamine (nPA). To the product of Example 3 is added a solution of 16 g nPA in 100 ml $H_2O$, and the resultant slurry (pH ca. 12.2) is stirred overnight and then filtered. The solid now exhibits a strong xrd peak at approximately 8.3°2θ, with a prominent shoulder at 9.4° 2θ. The lower angle peak is attributed to layers of MCM-69 which are now separated by nPA molecules, rather than simply by water molecules. When the solid is again stirred overnight and filtered, this time in a solution of 32 g nPA in 100 ml $H_2O$ (pH 12.8), the product shows a strong xrd peak at 8.3° 2θ, with little or no shoulder at 9.4° 2θ. When this nPA-intercalated MCM-69 is stirred overnight with 150 ml 0.5N HCl and filtered, the solid obtained shows the xrd pattern of MCM-69, with a strong reflection at 9.5° 2θ, indicating the effective removal of nPA And the regeneration of MCM-69.

EXAMPLE 5

Figure 3A:
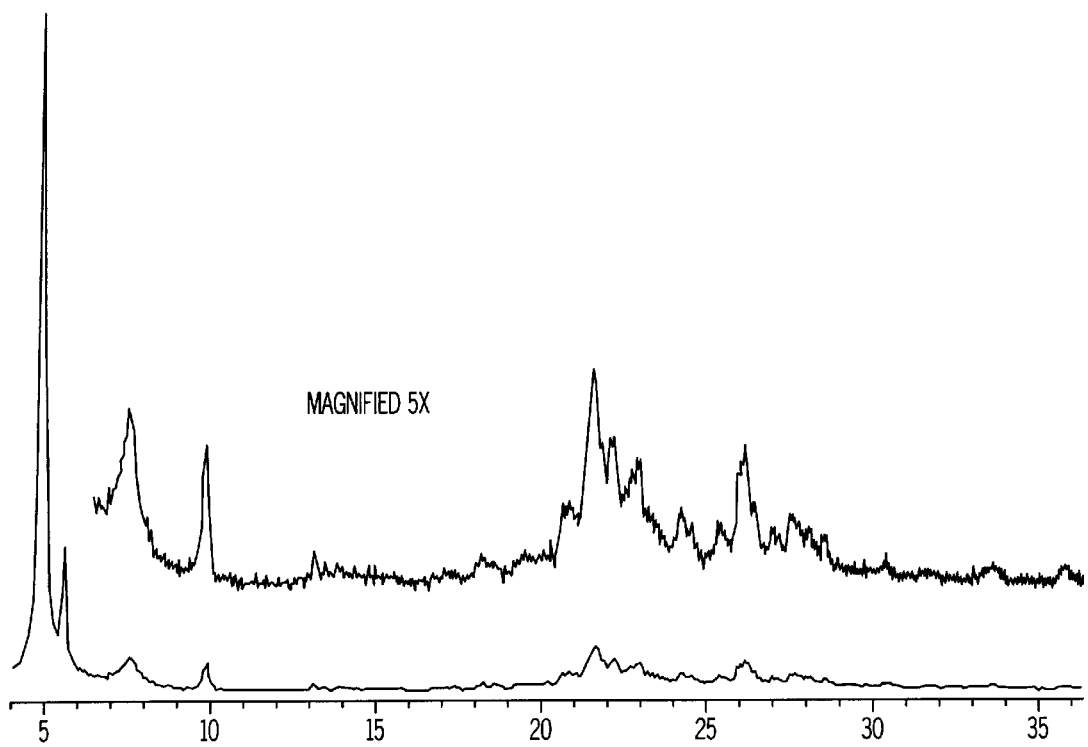
FIGS. 3a and 3b show X-ray diffraction patterns of MCM-69 to which pyrrolidine has been added.
Figure 3B:
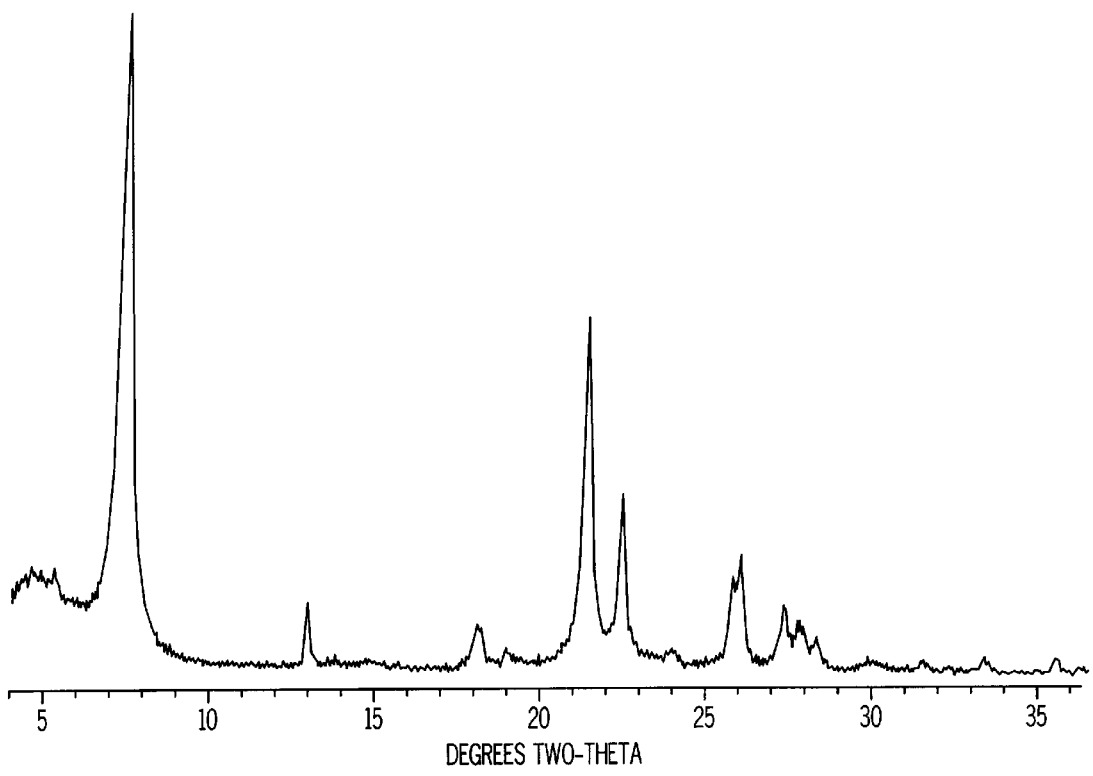

This Example describes the reversible addition of a different amine to MCM-69, namely, pyrrolidine (pyrr). To the product of Example 4 is added a solution of 40 g pyrr in 100 ml $H_2O$, and the resultant slurry is stirred overnight (pH 13.2) and filtered. The solid exhibits the xrd pattern shown in FIG. 3a, which contains low angle reflections at 4.9, 5.6, and 7.5° 2θ. The three reflections are attributed to layers of MCM-69, intercalated with varying amounts of pyrr. When the xrd sample is allowed to stand open to the air for a day (allowing excess pyrr to evaporate), the xrd pattern shown in FIG. 3b is obtained. It contains a strong reflection at 7.4° 2θ. When the solid is treated with 0.5N HCl as in the preceding Examples and filtered, the xrd pattern of MCM-69 is restored.

EXAMPLE 6

Figure 4:
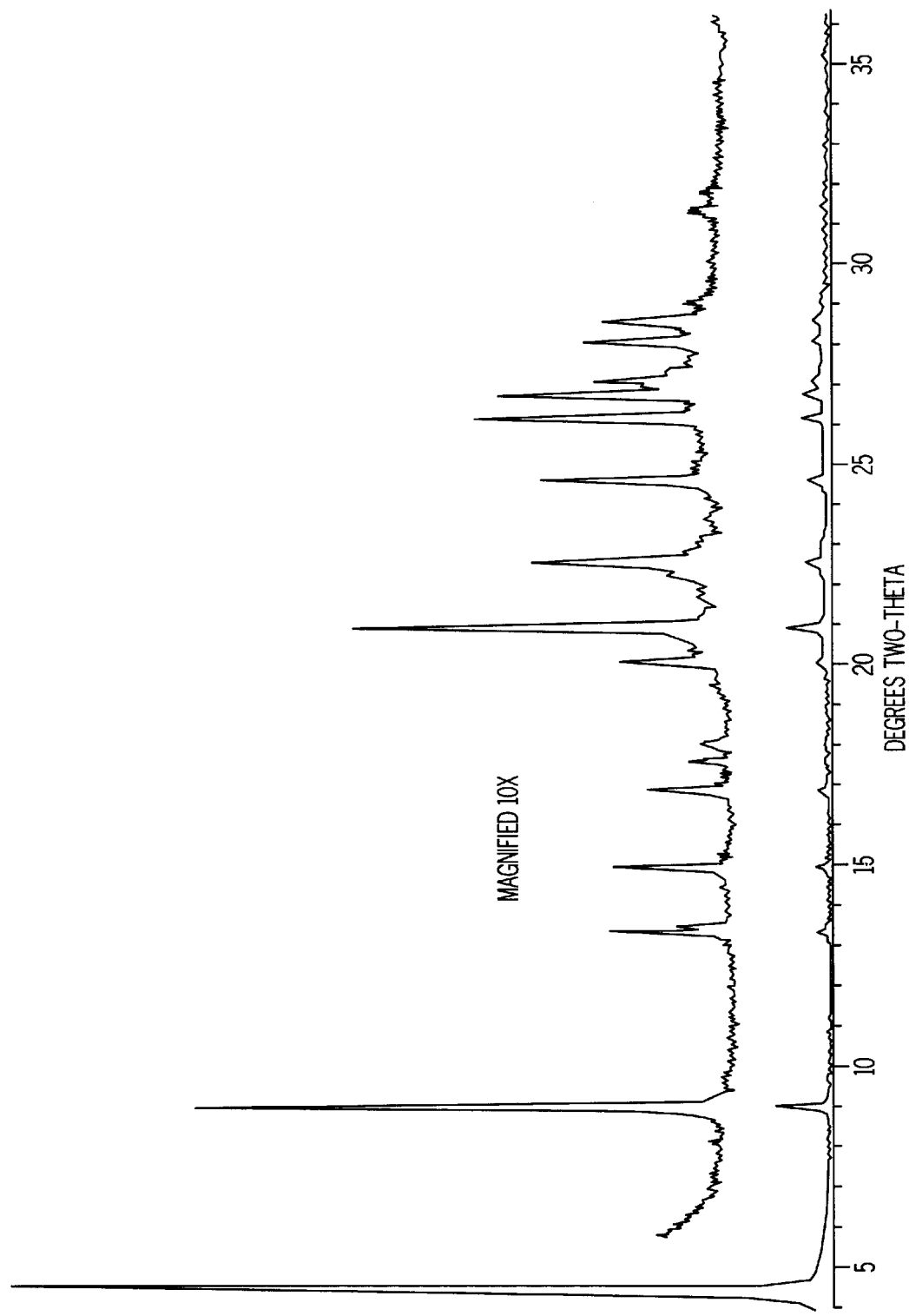
FIG. 4 shows the X-ray diffraction patterns of MCM-69 to which hexamethyleneimine (hmi) has been added.

This Example describes yet another addition of amine to MCM-69, using hexamethyleneimine (hmi). The product of Example 5 is stirred overnight with a solution of 50 g hmi in 100 ml $H_2O$ and filtered. Its xrd pattern contains very strong peaks at 4.4 and 5.0° 2θ. When the sample is slurried overnight with 100 ml 1M hmi and filtered, the product shows an intense xrd peak at 4.5° 2θ. Its xrd pattern is shown in FIG. 4. $^{13}C$ NMR shows that the hmi in the sample is intact and is protonated. Elemental analysis shows a N content of 2.43 wt % and an $SiO_2$ content of 38.4%, which corresponds to 0.8 hmi molecules per 3.0 $SiO_2$'s, confirming that one out of every three Si atoms in an ideal MCM-69 preparation is believed to contain a silanol. Note also, in Examples 4, 5, and 6, that the angle of the lowest strong xrd peak decreases (the d- or interlayer spacing increases) as the size of the amine increases, from nPA, to pyrr, to hmi, further consistent with amine intercalation between the MCM-69 layers.

EXAMPLE 7

This Example describes the addition of a higher molecular weight, surfactant-like amine to MCM-69 and uses n-octylamine (nOA). A 52 g sample of MCM-69(P) is converted to MCM-69 by two treatments with 500 ml 6N HCl, the first for four hours and the second overnight. The filtered product is then stored under 200 ml 6N HCl. The solid is then filtered and is added to a mixture of 52 g nOA and 150 ml water. The combined mixture is stirred two hours and left over a weekend. The solid is filtered and added to a mixture of 129 g nOA in 900 ml water. After stirring overnight, it is filtered, slurried again with 1L 1M nOA, stirred overnight, and filtered. A 15 g sample is added to 50 ml n-hexane, mixed well, filtered, and washed with 50 ml n-hexane. The product shows a strong xrd reflection at about 6.0° 2θ. On analysis it is found to contain 0.6 nOA molecules per three Si atoms.

EXAMPLE 8

This Example shows that n-dodecylamine (nC12A) generates an exfoliated material with MCM-69. A 60 g (wet)

sample of MCM-69, prepared as in Example 2, is mixed with a solution of 0.2 moles nC12A in 400 ml 1:1 (vol) ethanol:water, stirred 1 hr. and filtered. The procedure is repeated twice overnight with 0.4 moles nC12A in 800 ml 1:1 ethanol:water, and the product is washed with 100 ml 1:1 ethanol:water. Its xrd pattern contains strong reflections at 2.7, 3.4, 3.9, and 6.5°2θ. It contains 0.4 nC12A molecules for every three Si atoms.

EXAMPLE 9

This Example shows that drying destroys the exfoliation ability of MCM-69. A sample of MCM-69 prepared according to Example 2 is dried one hour at 120° C., reducing the moisture content to approximately 8%. The xrd reflection at 9.5°2θ is no longer present. In an effort to restore the interlayer spacing, the sample is then stirred overnight in 6N HCl at room temperature, filtered, washed, but not dried. The wet sample shows no xrd reflection at 9.5° 2θ.

EXAMPLE 10

This Example shows that MCM-69 does not convert into EU-20 on calcination. When a sample of MCM-69 is heated at 538° C. for 1 hr in air, the product contains no significant xrd peak between 10 and 11° 2θ (see A. J. Blake et al., loc. cit.).

EXAMPLE 11

This Example shows that the surface silanol groups of MCM-69 can be reacted with hydroxide ion. A 25 g sample of wet MCM-69, prepared according to Example 2, is slurried with 100 ml water and the pH is adjusted to 10.0 by titration with 42 ml of 40% tetrapropylammonium hydroxide solution. After stirring for 3 hours, the solid is filtered. Its xrd pattern shows a new reflection, at 6.2° 2θ. The procedure is repeated, this time adjusting the initial pH to 12.0. After stirring overnight, the pH is 10.2. In the xrd pattern of the filtered solid, the reflection at about 6.2° 2θ has more than doubled in intensity.

EXAMPLE 12

This Example shows that MCM-69 can be rendered hydrophobic by surface functionalization. The exfoliated product of Example 6 is combined with 80 ml hexamethyidisilazane and stirred over a weekend in a dry atmosphere. The solid is filtered (whereupon an odor of ammonia is observed) and washed with acetone. The xrd pattern of the solid has strong reflections at 5.1, 6.1, and 7.7° 2θ. On contact with water the solid shows itself to be completely un-wetted, i.e., hydrophobic.

EXAMPLE 13

This Example shows that MCM-69 has activity for the catalytic conversion of hydrocarbons. When a sample of MCM-69, prepared according to the procedures of Example 2 and containing 0.1% alumina, is subjected to the standard (n-hexane) catalytic cracking activity test described in U.S. Pat. No. 3,354,078 and in the *Journal of Catalysis*, Vol. 61, p. 395, it is found to have an alpha-activity of 2.

EXAMPLE 14

A 20 gram sample of wet MCM-69 swelled with primary amine was washed with absolute ethanol (EtOH) and then combined with 200 grams of tetraethylorthosilicate (TEOS). The resulting solid was filtered, washed with EtOH, dried in air and then calcined for one hour at 538° C. The product was almost white and sorbed an apparently zeolitic 2.4 wt. % n-hexane. Analogous experiments using the pre-swelled hmi-MCM-69 yielded unfilterable gels.

What is claimed is:

1. A synthetic crystalline silica hydrate which is characterized by an X-ray diffraction pattern including d-spacing and relative intensity values substantially as set forth in Table I of the specification.

2. The synthetic crystalline silica hydrate of claim 1 which is exfoliatable with a $C_3$–$C_{24}$ primary amine to yield materials having a strong xrd reflection below 10.5° 2θ.

3. The crystalline material of claim 1 having a composition expressed by the formula $H_2O \cdot (SiO_2)_{(6-x)}(X_2O_3)_x$ where X is a trivalent element and x is less than about 0.01.

4. The crystalline material of claim 3 wherein X is aluminum.

5. The crystalline material of claim 1 having a composition expressed by the formula $H_2O \cdot 6\ SiO_2$.

6. A method for synthesizing a crystalline material exhibiting a characteristic X-ray diffraction pattern including d-spacing and relative intensity values shown in Table I which comprises (i) preparing a mixture capable of forming said material, said mixture comprising sources of alkali or alkaline earth metal (M), an oxide of trivalent element (X), an oxide of silicon (Y), water, and directing agent (R) comprising piperazine, and having a composition, in terms of mole ratios, within the following ranges:

| | |
|---|---|
| $YO_2/X_2O_3$ | >100 |
| $H_2O/YO_2$ | 10–40 |
| $OH^-/YO_2$ | 0.01–0.3 |
| $M/YO_2$ | 0.01–0.3 |
| $R/YO_2$ | 0.5–3.0 |

(ii) maintaining said mixture under sufficient conditions including a tempature of from about 80° C. to about 250° C. until crystals of a piperazine-containing material are formed;

(iii) removing at least 50% of said piperazine from said piperazine-containing material; and (iv) recovering said crystalline material from step (iii) under non-drying conditions.

7. The method of claim 6 wherein said mixture has the following composition ranges:

| | |
|---|---|
| $YO_2/X_2O_3$ | >1000 |
| $H_2O/YO_2$ | 20–30 |
| $OH^-/YO_2$ | 0.05–0.2 |
| $M/YO_2$ | 0.05–0.2 |
| $R/YO_2$ | 1.5–2.5. |

8. The method of claim 6 wherein at least 80% of said piperazine is removed from said piperazine-containing material by treatment with acid.

9. The method of claim 7 wherein at least 90% of said piperazine is removed from said piperazine-containing material by treatment with acid selected from the group consisting of HCl, HNO$_3$, H$_2$SO$_4$, H$_3$PO$_4$, trifluoromethane-sulfonic acid (triflic acid), and acetic acid.

10. The method of claim 6 wherein said mixture further comprises seed crystals in sufficient amount to enhance synthesis of said crystalline material.

11. The method of claim 6 wherein M comprises sodium.

12. The method of claim 6 which further comprises (v) treating said crystalline material with a surface-bonding agent which is reactive with silanol.

13. The method of claim 12 wherein said surface-bonding agent is selected from the group consisting of amine, hexamethyldisilazane and metal ions.

14. The method of claim 13 which further comprises vi) contacting said crystalline material with a hydrolyzable silicon compound.

15. The method of claim 14 wherein said hydrolyzable silicon compound is tetraethylorthosilicate.

16. A process for converting a feedstock comprising organic compounds to conversion product which comprises contacting said feedstock at organic compound conversion conditions with a catalyst comprising the synthetic crystalline material of claim 1.

* * * * *